June 23, 1964  R. H. DUNCANSON ETAL  3,138,513
APPARATUS FOR SEALING SHEETS HAVING CURVED EDGES
Filed Jan. 27, 1961  3 Sheets-Sheet 2
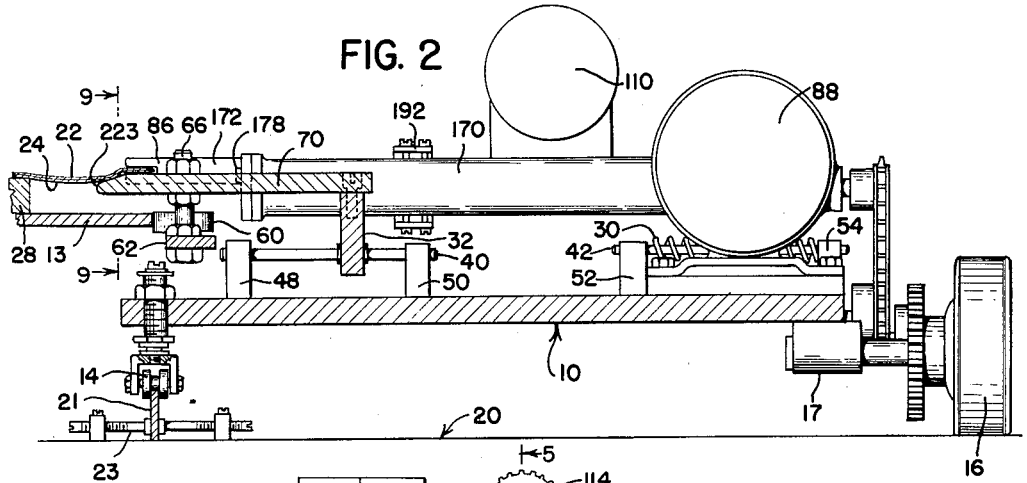
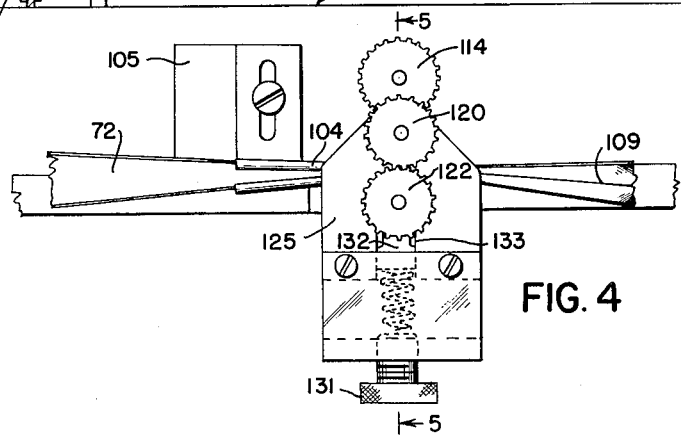
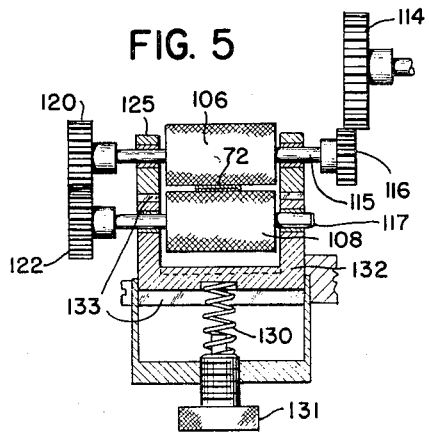
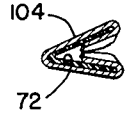
*INVENTORS*
ROBERT H. DUNCANSON
LEROY E. NELSON
BY
*Stuart R. Peterson*
ATTORNEY June 23, 1964  R. H. DUNCANSON ETAL  3,138,513
APPARATUS FOR SEALING SHEETS HAVING CURVED EDGES
Filed Jan. 27, 1961  3 Sheets-Sheet 3
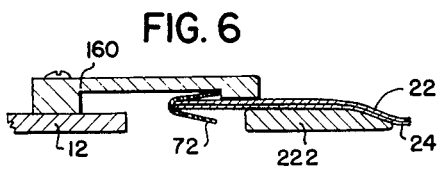
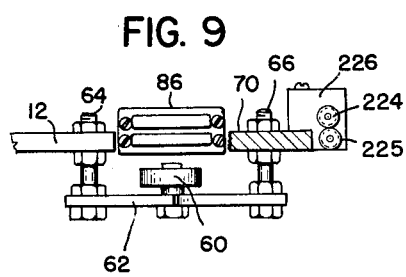
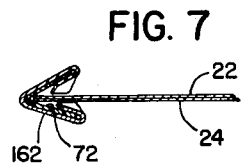
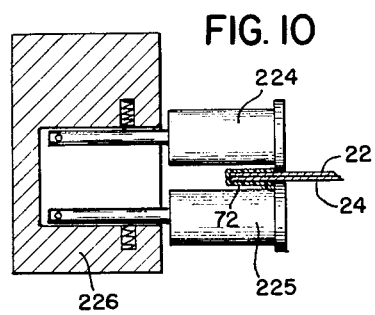
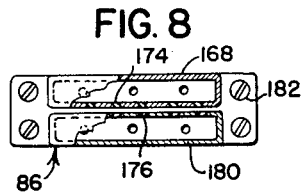
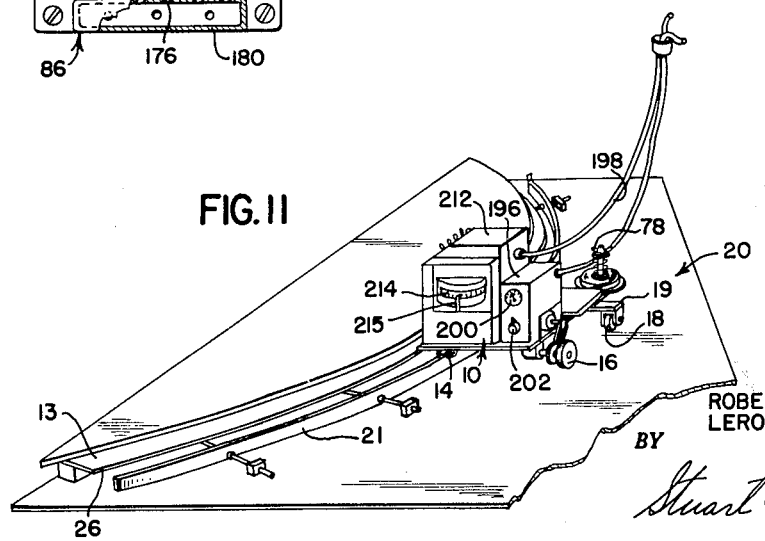
INVENTORS
ROBERT H. DUNCANSON
LEROY E. NELSON
BY
Stuart R. Peterson
ATTORNEY

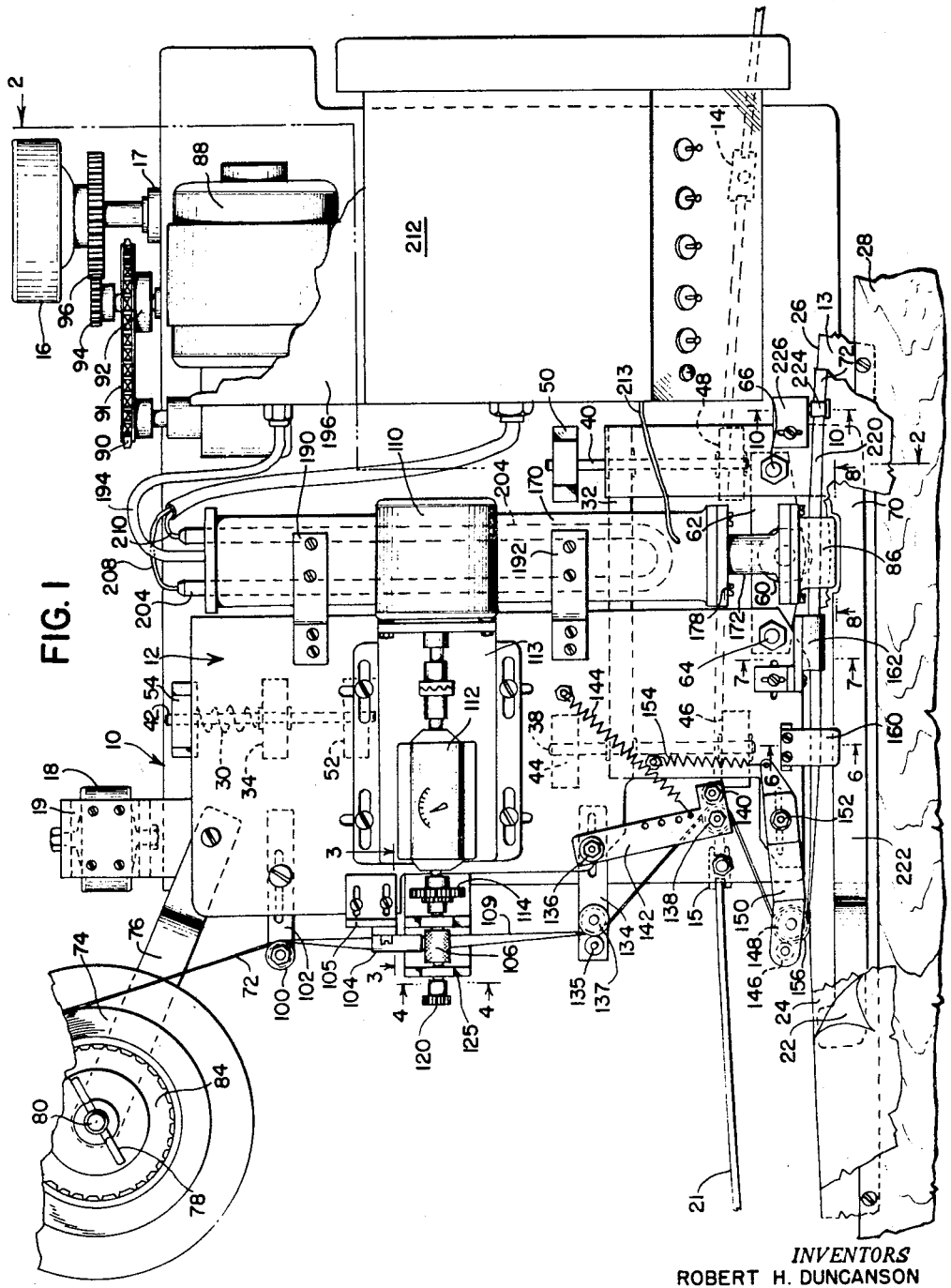

United States Patent Office 3,138,513
Patented June 23, 1964

---

3,138,513
APPARATUS FOR SEALING SHEETS HAVING CURVED EDGES
Robert H. Duncanson and Leroy E. Nelson, Minneapolis, Minn., assignors to General Mills, Inc., a corporation of Delaware
Filed Jan. 27, 1961, Ser. No. 85,394
15 Claims. (Cl. 156—467)

This invention relates to sheet sealing machines and more particularly to machines adapted to seal together sheets by the application of a sealing tape over the edges to be sealed. The invention is particularly well adapted for sealing together plastic sheets having curved edges and will find especial utility in sealing together the gores used in the manufacture of high altitude research balloons. Likewise, other articles formed from sheets of plastic material, particularly those having curved edges, such as swimming pools, tents, air mattresses and the like can be effectively sealed.

Machines for applying heat sealing tape to seal together the edges of sheet material are well known. It is the usual practice, however, to bond the sealing tape to the edges of the sheets to be sealed through the use of heated rollers which are forced against the sides of the sealing tape as the tape is applied. Whether these rollers are driven or merely idler rollers, they will almost always cause undesirable lateral forces to be exerted on the sheet material being sealed which results in wrinkles either in the sheet material being sealed or in the tape. Moreover, since there is only a relatively short dwell time, between the rollers and the tape, the rollers must be driven relatively slowly or heated to a relatively high temperature in order to heat the tape sufficiently to bring about satisfactory bonding between the tape and the underlying sheet material. As a result, heat from the rollers themselves is rarely sufficient to bring about adequate sealing at a practical rate so that a preheater has been suggested to preheat the tape. Such preheating permits the speed of the rollers to be increased, as well as to insure full transfer of heat through the entire thickness of the material being sealed. One of the most significant disadvantages of prior art heat sealing tape applicators using heated rollers is that such sealing machines are poorly suited for sealing together the edges of sheets having curved edges. This results from the tendency of the rollers to move across the sheet material along straight lines. When a curve is encountered, either the rollers must slide relative to the underlying tape or, more usually, they will cause undesirable wrinkling to take place in the tape or sheet material.

In the balloon art it has been one general practice to seal together the gores used in making balloons by laying a pair of gores side by side on a table so that their longitudinal axes are approximately parallel and then manually bring each succeeding portion of the edges of the two gores into abutting relationship just ahead of the point at which a sealing tape is applied to the abutting edges. In practice, it has been found that the workmen who position the edges of the gores often times will imperfectly align the edges so that in some areas the edges of the gores to be sealed are overlapped and in other areas the edges are slightly separated. Moreover, when the tape has been applied throughout the entire length of the seam, a number of transverse wrinkles will be found either in the tape or in the sheet material. Because of imperfect alignment of the edges and the wrinkling found in the sheet material and sealing tape, the seals are sometimes found to leak or have insufficient strength.

In contrast with the prior art, the present invention provides very consistent high quality seals which seldom exhibit leaks or weak areas. The sealing apparatus according to the present invention will not exert any lateral forces on the sheet material during the sealing operation so that the uniformity of the seal is improved and the tendency for wrinkles to be formed is lessened. No mechanical pressure is applied to the sheets or tape by the apparatus according to the present invention. Nevertheless, a very uniform and high strength shear type seal is produced. In contrast with heat sealing operations wherein the sheets to be sealed are fused together solely through the use of heated rollers, the seals produced by the apparatus according to this invention have a much greater percentage of the strength of the sheet material since the sheet material is not decreased in thickness as it often times is in a heat sealing operation due to the pressure of the heated jaws or rollers.

Furthermore, the present invention will very readily and effectively seal sheet material having curved edges as well as that having straight edges. In this regard, it will seal sheets having either convex or concave edges with little tendency to produce wrinkles. Since no lateral forces are applied on the sheet material or tape during the sealing operation, there will be no greater tendency to produce wrinkles when curved edges are being sealed together than there will when straight edges are being sealed. Consequently, the invention is particularly advantageous in the manufacture of high altitude research balloons and the like. It produces seals between the gores of such balloons which have superior strength and better uniformity than those fabricated by conventional techniques. The balloons made with the use of the present invention are more reliable, require less inspection and can be manufactured much more rapidly.

It is thus an important object of the present invention to provide an improved apparatus especially adapted for sealing together sheet material having curved edges.

It is a further object of this invention to provide an improved sealing apparatus for sealing together the edges of plastic sheet material which will follow the curved edges of said sheets without exerting lateral forces on the sheets. More specifically, the invention has for an aim the provision of an improved apparatus for applying heat sealing tape to the edges of sheet material to seal the sheets together in a manner providing strong, durable seals consistently free from wrinkles and leaks.

Another object is to provide an apparatus of the above-referred to type that reduces appreciably the handling and moving of the plastic sheets prior to and during the tape applying procedure compared with certain prior art systems.

It is a still further object of this invention to provide an improved heat sealing tape applicator wherein no preheater is required to heat the tape before it is applied to the sheets being sealed.

Before proceeding with a detailed description of our invention, a brief description of the invention will be presented.

In general, our invention is disclosed in connection with an apparatus which includes relatively movable supporting plates mounted for guided movement along corresponding edges of a plurality of sheets which are superimposed with respect to each other and which are to be joined together along said edges. Heat sealable tape which is to be applied to the edges of the sheets so as to join said sheets together is stored on the upper of the relatively movable plates and is applied to said sheets by first longitudinally folding said tape substantially in half. The tape is thereafter applied over the edges of the two adjacent sheets to be joined, and after this a heated fluid medium, such as air, is directed onto the upper and lower faces of the tape to thereby heat seal it to the sheets. Controls are provided for regulating the temperature of the heating means, the pressure of the fluid medium, speed of the apparatus and the like.

The invention will be best understood by reference to the following illustrative embodiment taken in connection with the figures wherein:

FIGURE 1 is a plan view of the apparatus according to the present invention;

FIG. 2 is a vertical sectional view taken along line 2—2 of FIGURE 1;

FIG. 3 is a vertical sectional view taken along line 3—3 of FIGURE 1;

FIG. 4 is a side elevation taken along line 4—4 of FIGURE 1;

FIG. 5 is a partial sectional view taken along line 5—5 of FIG. 4;

FIG. 6 is a vertical sectional view taken along line 6—6 of FIG. 1;

FIG. 7 is a vertical sectional view taken along line 7—7 of FIG. 1;

FIG. 8 is a side elevation partly broken away along line 8—8 of FIG. 1 showing the preferred form of heater nozzle according to the present invention;

FIG. 9 is a partial vertical view taken along line 9—9 of FIG. 2;

FIG. 10 is a vertical sectional view taken along line 10—10 of FIG. 1;

FIG. 11 is a perspective view of the apparatus according to the present invention while in use.

Referring to the figures which show a heat sealing apparatus according to the present invention. The apparatus includes a movable supporting plate 10, provided with wheels 14, 15, 16, and 18 which support said plate 10 above a table 20. Driven wheel 16 is rotatably mounted in a pillow block bearing 17 attached to the bottom of supporting plate 10, while wheel 18 is journaled in a similar bearing 19 also atached to supporting plate 10. Each of the two wheels 14 and 15 is provided with a circumferential groove in the center thereof which is adapted to fit over the top edge of guide means, said guide means being comprised of a track 21 attached to the table 20 and a template 13. The track 21 extends generally parallel to the edges of the template 13 and is secured to the table 10 by any convenient fastening means such as the threaded adjusting means 23. The guide means, that is, the template 13 and track 21, guide the sealing apparatus along a path generally parallel to the edges of the sheets being sealed.

Sheets 22 and 24, as best seen in FIGURES 1 and 2, are laid flat on template 13, the edges to be sealed being superimposed and aligned with the edge 26 of template 13, which has the same curvature as the aligned edges of the sheets 22 and 24. For purposes of illustration, we are describing this invention in connection with sheets made of mylar. We have found that the inherent properties of mylar are such that many problems are encountered in attempting to join two mylar panels together by directly sealing one to the other. Therefore, we join two mylar panels together by applying a tape over two edges of adjacent mylar panels. It is not, however, our intention to limit our invention merely for use with respect to mylar panels, as it is envisioned that other types of material could be joined together as well. If desired, sheets 22 and 24 may be spaced from template 13 by means of a flat spacer 28 having generally the same shape as the template 13.

Slidably mounted above plate 10 is a platform designated generally by reference numeral 12. Said platform forms a flat generally rectangular upper plate which is forced toward the edges of the sheets which are to be sealed, by spring 30 in a direction substantially normal to the edges of said sheets and along an axis lying in the plane of said sheets. To accomplish the relative sliding movement between supporting plate 10 and platform 12, supports 32 and 34, attached to platform 12, parallel rods 38, 40 and 42, and fixed upright supports 44 and 46, 48 and 50, and 52 and 54, attached to plate 10, are provided.

A guide wheel 60 is rotatably mounted on the upper side of plate 62, said plate 62 being in turn rigidly supported from the platform or upper plate 12 by means of a bolt 64 at one end, note FIG. 9. Plate 62 is also connected at the other end thereof by means of bolt 66 to L-shaped guide member 70 which will be described in greater detail hereinbelow, although it can be stated at this time that the member 70 is fixedly carried by the platform 12. Spring 30 urges support 34 and platform 12 toward a curved edge 26 on template 13 until guide wheel 60 contacts said edge 26. Guide wheels 60, and template 13 aid in providing fine positioning of the platform 12 relative to the sheets by causing platform 12 to slide laterally with respect to the supporting plate 10. The tape applicator folder blade 162 and nozzle means 86, which will be described hereinbelow, are compelled to follow very accurately even slight changes in the curvature of template 13.

In operation, sealing tape 72 is withdrawn from a storage means such as a supply roll 74 attached to platform 12 by means of arm 76. A wing nut 78 threaded onto the upper end of supply roll axle 80 is used to adjust the tension on roll 74 by the compression of a spring against the upper surface of spool 84 upon which the tape supply roll 74 is mounted. As the tape is withdrawn from supply roll 74, it passes over a series of rollers, through folder blades and finally is applied to sheets 22 and 24 in overlapping relationship with the edges thereof. Heat is then applied to the tape to cause fusion between the tape and the sheets to be sealed by means of the nozzle means 86. When sealing mylar sheets we have used commercially available flexible tape which has a heat sensitive adhesive coated to one surface, said adhesive becoming tacky when heat is applied thereto. However, in some situations it is envisioned that a tape of thermoplastic material without added adhesives would be suitable. As the tape is continuously applied to the edge of the sheets the entire sealing apparatus is moved relative to the sheets along table 20, preferably at a constant speed, by suitable drive means such as a motor 88 connected to wheel 16 through a suitable drive train such as sprockets 90 and 92, chain 91, and gears 94 and 96. In the event that only a small amount of sealing is to be done or where cost is an important factor, the material and tape may be moved manually thru the nozzle means 86, in which case the drive means may be eliminated.

After being withdrawn from supply roll 74, the tape 72 passes over a roller 100 supported from plate 12 by an adjustable arm 102, and then through a first folder blade 104 (see FIGS. 3 and 4 in particular) which is supported from the platform or plate 12 by bracket 105. The tape passes from folder blade 104 between fine knurled precreaser rollers 106 and 108 (note FIGS. 4 and 5). Rollers 106 and 108 are mounted on shafts 115 and 117 respectively and are driven by a suitable drive means such as motor 110. Motor 110 is mounted on a flanged support 113 and is coupled to a variable speed reducer 112 which is also attached to flanged support 113. Speed reducer 112 drives roller 106 by the engagement of a gear 114 attached to the output shaft of speed reducer 112, with a spur gear 116 attached to shaft 115. Variable speed reducer 112 synchronizes the tape feed from the roll 74, with the forward speed of the machine. Speed reducer 112 may be any commercially available reducer and will not be described in detail. Rollers 106 and 108 are in turn geared together by means of spur gears 120 and 122 rotatably secured to shafts 115 and 117 respectively. Shaft 115 is journaled in a U-shaped support bracket 125; and shaft 117 is journaled in a member 132 adapted to slide within slot 133 located in bracket 125 in a direction normal to the axis of roller 106. Member 132 forces roller 108 against roller 106 by means of spring 130. The compression of spring 130 can be adjusted by tightening or loosening spring adjustment nut 131 which is threadedly inserted in bracket 125.

Rollers 106 and 108 serve to withdraw tape from supply roll 74 and to advance the tape 72 towards the point where it is applied to the sheets to be sealed, as well as to form a temporary longitudinally extending crease 109 in the center of the tape to help assure that the center of the tape will abut the edges of the sheets, and lay relatively flat, without springback, prior to application of heat.

After passing through rollers 106 and 108, the tape is unfolded and passes between rollers 135 and 137 mounted on a fixed arm 134 which is in turn attached to platform 12 by bolt 136. The tape then passes between a pair of tension regulating rollers 138 and 140 mounted on arm 142 which is pivotally mounted on platform 12, about bolt 136. Arm 142 is caused to pivot counter-clockwise, as shown in FIGURE 1, by means of a suitable coil spring 144 connected between arm 142 and platform 12. Arm 142 aids in regulating the tension of tape 72, as well as permitting some error to exist in the synchronization of the speed reducer 112. The error itself can be adjusted while the machine is in operation.

The tape next passes between rollers 146 and 148 mounted at the end of arm 150 which is pivotally mounted on platform plate 12 about bolt 152. Spring 154 connected between arm 150 and platform 12 causes arm 150 to pivot so that rollers 146 and 148 swing toward template 13. Rotatably mounted below roller 148 is a guide roller 156 adapted to rotate in the plane of template 13 about an axis normal to the surface thereof, the circumferential edge of roller 156 being adapted to roll along edge 26 of template 13. Arm 150 will thus pivot relative to plate 12 in response to changes in curvature of the template 13 so that the application of tape 72 to the sheets 22 and 24 will follow accurately even slight changes in the curvature of their edges.

After passing over roller 148, tape 72 passes below a T-shaped plate member 160 (note FIG. 6), prior to passing through a second folder blade 162 (note FIG. 7). Sheets 22 and 24 may not lay perfectly flat when laid out prior to sealing, inasmuch as waves or bulges might occur in certain areas. Furthermore, tape 72, which is folded in folder blade 162 prior to passing through nozzle means 86, may not be properly positioned with respect to said sheets, thus preventing a proper seal. Plate 160 prevents the material from bulging as well as insuring proper placement of the folded tape 72 with respect to the sheets, by preventing said sheets from snapping out of the folded tape in that area.

As explained hereinbefore, the precreaser rollers 106 and 108 provide a temporary central longitudinally extending crease 109 in the center of tape 72 which cooperates with the folder blade 162 identical to the earlier-mentioned folder blade 104, to assure that the center of tape 72 overlies the superimposed edges of sheets 22 and 24. The folder blade 162 is secured to plate 12 by suitable fastening means. After passing through folder blade 162, the inside surfaces of the tape lie adjacent the sides of sheets 22 and 24 and is in position for sealing thereto.

The sheet material and tape next passes through nozzle means 86 which is comprised of a hollow upper nozzle 168 and a hollow lower nozzle 180 (note FIG. 8). Each nozzle communicates with heater 170 through duct 172. Duct 172 is secured to heater 170 by means of screws 178 while nozzles 168 and 180 are secured to the opposite end of duct 172 by means of any suitable fastening means such as screws 182, nozzles 168 and 180 have a plurality of inclined openings 174 and 176 for directing a heated fluid medium, preferably air when mylar sheets are being sealed because air does not indent the tape or the thin film material constituting the sheets, onto the upper and lower surfaces of folded tape 72. Openings 174 and 176 are both inclined with respect to the surfaces of tape 72 so that the air passing therethrough moves along the surfaces of the tape 72 in the direction in which tape 72 is traveling through the nozzle means 86. Nozzle means 86 performs three simultaneous functions. First, it simultaneously heats the tape 72 and the edges of sheets 22 and 24 until adjacent surfaces of the tape and/or sheet material have reached an elevated temperature. As mentioned above, we preferably use a tape which is coated with an adhesive which is activated by heat. This permits a relatively lower temperature and the sheets 22 and 24 are not subjected to damaging effects from the heat. Second, the air passing out through the openings 174 and 176 presses the tape 72 onto the marginal surfaces of sheets 22 and 24 to asuure that the tape and sheet material are in contact when fusion or sealing occurs between the tape and sheet material. Third, the provision that openings 174 and 176 be inclined with respect to the surfaces of tape 72 permits the air to travel in the same general direction as the direction of movement of the tape and sheet material relative to nozzle means 86. This feature helps to smooth the tape as it is being applied so as to reduce the tendency for wrinkles to form in the finished seal; it also eliminates bubbles of air between the sheets and tape and material vibration; furthermore, it helps prevent any air forces from moving the material from proper location.

Heater 170 comprises an elongate hollow casing communicating at one end with the nozzle means 86 through duct 172 and communicating at the other end with a source of fluid medium, such as compressed air supplied through tube 194 from pressure regulator 196. Heater 170 is attached to platform 12 by means of brackets 190 and 192. Pressure regulator 196 in turn receives air or other suitable gas from any convenient source of compressed air through tube 198 as shown in FIGURE 11. While any suitable pressure regulator may be used, it is preferred that the pressure regulator 196 include a pressure indicator such as gauge 200 and a pressure regulator control valve such as control valve 202, so that it is possible to control the pressure of air within the heater 170 and the flow of heated air through openings 174 and 176 onto tape 72. The flow of air through openings 174 and 176 controls the pressure of the air on tape 72; in other words, high flow rate normally results in greater pressure. The amount of pressure required is determined by the thickness of the material, the relative speed of the machine with respect to the material, and the like. A mere increase in heat does not necessarily mean that the air pressure should be increased. Conversely, there may be instances when increased air pressure is required to insure good solid contact of the tape to the material, and a corresponding increase in heat is not required. There may be instances however, when the air pressure must be increased to carry the heat required; for example, greater heat losses might occur when thicker materials are used, especially when the speed of the machine is increased.

Heat is supplied to heater 170 by any convenient heating means such as heating element 204 which extends almost the entire length of the heater 170. Current is supplied to heating element 204 through conductors 208 and 210 respectively leading from a suitable heater control 212. Any suitable commercially available heater control may be utilized and will not be described in detail. It is preferred that the heater control include a means for sensing the temperature of the nozzle means 86, such as a thermocouple connected to the heater 170 by means of suitable conductors 213. The temperature is recorded on a temperature indicator gauge 214 located on control 212, and a temperature adjustment lever 215 is provided so that the temperature of the heater 170 may be adjusted as desired. The temperature regulator 212 is of conventional construction and includes the usual conductors, transformers, relays and the like and therefore will not be described in detail.

After passing through nozzle means 86, the heated tape and sheet material begin to cool. When sufficient cooling has taken place, the tape becomes firmly bonded to the sheet material. At this point, it passes over the upper surface of a first portion of guide member 70 designated by reference numeral 220, said first portion being disposed transversely of the edges of the sheets being sealed. Guide member 70 also includes a second portion designated by reference numeral 222, said second portion having an axis disposed generally parallel to the edges of the sheets 22 and 24 and has an inclined surface 223. The upper surface of guide member 70 is positioned in the same plane as the opening between portions 168 and 189 of the heat sealing nozzle means 86. Member 70 thus serves to help position the sheets between the upper and lower portions of nozzle means 86.

After passing over guide member 70, the sealed edges of the sheets pass between two spring loaded rollers 224 and 225 mounted in member 226, said member 226 being attached to guide 70 by any suitable means. Rollers 224 and 225 have flanges 228 and 229 respectively, which bear against the sheets as said sheets pass between the rollers 224 and 225. Said rollers aid in preventing the completed seal from pulling away from the machine, particularly when said machine travels around a curvature in the sheets being joined together, because of the retaining or gripping action provided by the flanges against the now inturned edges of the tape 72 that has now been firmly adhered to the sheets 22, 24. Furthermore, they prevent a gap from forming between the sheets when said sheets do not abut against the crease 109 in the folded tape 72. Compression springs 131 and 133 cause rollers 224 and 225 to be drawn towards each other.

The invention thus provides an improved heat sealing apparatus for joining the edges of two sheets together. It is particularly well adapted for sealing together the curved edges of gores used in the manufacture of balloons and the like. The seals formed are more uniform than those produced previously and have fewer wrinkles and less shrinkage. Track 21 permits approximate positioning for the supporting plate 10 as it moves relative to the edges of the sheets to be sealed, and template 13 permits relatively fine positioning of the platform 12 with respect to said edges of the sheets. Relative movement of platform 12 with respect to supporting plate 10 and the sheets permits the tape 72 to be applied to the edges of said sheets so that no substantial lateral forces are applied to the edges of the sheet during the sealing process, and the tendency for imperfections to be formed in the finished seal is substantially reduced.

In the above description and attached drawings a disclosure of the principles of this invention is presented, together with some of the ways in which the invention may be practiced.

What is claimed is:

1. A heat sealing apparatus for sealing together the edges of two sheets of plastic material with a flexible tape comprising movable support means, means for guiding said support means along said edges, means for applying the tape in a folded condition over said edges as said support means moves along the edges, a source of gaseous medium, means for heating said gaseous medium, and nozzle means carried by said movable support means for directing heated gas to the entire exposed outer surface of said tape to press the tape firmly against the sheets and thereby adhere said tape to said edges.

2. A heat sealing apparatus according to claim 1 including means for varying the pressure with which said tape is pressed against the sheets by varying the flow of gas from the gas source through said nozzle means.

3. A heat sealing apparatus according to claim 1 including means for supporting said sheets in a generally horizontal plane and in which said nozzle means includes a first nozzle above said folded tape and a second nozzle below said folded tape.

4. A heat sealing apparatus according to claim 3 in which each nozzle includes a plurality of openings inclining rearwardly with respect to the movement of said support means.

5. A heat sealing apparatus for sealing together the edges of two sheets of plastic material with a flexible tape comprising movable support means, means carried by said support means for folding said tape about the edges of said sheets, and means also carried by said support means for then sealing the inner surfaces of said tape to said edges, said last-mentioned means including a source of gaseous medium, means for heating said gaseous medium, and means for directing said heated gaseous medium onto the tape so as to seal said tape to the sheets.

6. A heat sealing apparatus according to claim 5 including tape supply means on said support means, and means for precreasing said tape before it reaches said folding means.

7. A heat sealing apparatus according to claim 5 including a pair of roller located near said sealing means, each roller being provided with a flange engageable with one edge of the tape after it has been adhered to the sheets, whereby said sheets are prevented from moving laterally in one direction away from said sealing means.

8. A heat sealing apparatus for sealing together the edges of sheet material comprising a supporting plate, drive means operatively associated therewith to move said supporting plate relative to said sheet material longitudinally of the edges of said sheets, means for guiding said supporting plate along a path parallel to the edges of the sheet to be sealed, means connected to said plate for continuously folding sealing tape into overlapping relationship with the edges of the sheets to be sealed, a source of gaseous medium and means connected to said plate for directing a stream of heated gas onto the entire exposed surface of said tape after it has been applied to the edges to be sealed, said tape being thereby sealed to said sheet material to form a shear type seam between the edges of said sheets without subjecting said sheets to substantial lateral forces during the sealing operation.

9. A heat sealing apparatus for sealing together the edges of sheet material comprising in combination a supporting plate, means for moving said plate longitudinally with respect to the edges of said sheets, means connected to said plate for advancing tape at a controlled rate toward the edges of the sheets to be sealed independently of the relative movement of said plate, means for continuously folding said tape into overlapping relationship with the edges of said sheets, a source of gas supply, and nozzle means connected to said plate for directing heated gas onto exposed surfaces of said tape after it has been applied in overlapping relationship with the edges of said sheets, the temperature of said gas being sufficient to fuse said tape to adjacent surfaces of said sheet material to form a continuous seam between the edges of said sheets, said tape being sealed to said sheet material solely by the application of heat from said heater nozzle means whereby a strong wrinkle free seam is formed between the edges of said sheets.

10. An apparatus adapted to seal together sheets having curved edges comprising a supporting plate, a source of air pressure, means for heating said air, means for controlling the temperature of said air, means for controlling the pressure of said air, respective nozzles for directing said heated air onto each side of said curved edges, means for storing a supply of tape, said tape being adapted to seal together the edges of said sheets when heat is applied thereto, means positioned ahead of said nozzles to guide said tape into overlapping relationship with said edges, means for supporting said sheets, and means for guiding said apparatus along a path parallel to said edges when said apparatus moves longitudinally relative to said edges, said apparatus being adapted to seal said tape into overlapping relationship with each side of said edges without exerting substantial lateral forces on said sheets.

11. A heat sealing apparatus for sealing together sheets having curved edges comprising a first member movable longitudinally of the edges of sheets to be sealed, first guide means to guide said first member along a path approximately parallel to the edges of the sheets to be sealed when said member is moved longitudinally of the edges to be sealed, a second member slidably mounted on said first member for movement in a direction normal to the edges of said sheets and along an axis lying in the plane of said sheets, second guide means operatively associated with said second member to provide fine positioning of said second member relative to the edges to be sealed, means connected to said second member to fold heat sealing tape continuously into overlapping relationship with each side of the edges to be sealed as said apparatus moves longitudinally of said edges, and means attached to said second member for heating said heat sealed tape after it has been applied to said edges by directing a stream of heated air onto the exposed surface of said tape.

12. A heat sealing tape applicator comprising a support, a storage means attached to said support for storing a supply of heat sealing tape, a folder attached to said support, said folder being adapted to continuously fold said tape longitudinally as it is withdrawn from said storage means, a pair of cooperating precreaser rollers attached to said frame, said precreaser rollers being adapted to advance said tape after it has passed through said folder while said tape is folded longitudinally, the pressure of said rollers against said folded tape forming a temporary longitudinal crease in said tape, drive means connected to said precreaser rollers to rotate said rollers independently of the relative movement of the support, and means for continuously applying the temporarily creased tape in overlapping relationship with the edges of the sheets to be sealed, a source of gas pressure, said heater means for heating said tape after it has been applied to said edges to a temperature sufficient to bond said tape to the edges of said sheets by directing a stream of heated air onto the exposed surface of said tape.

13. A heat sealing tape applicator comprising a first member movable longitudinally of the edges of the sheets to be sealed, first guide means to guide said first member along a path paralleling the edges of the sheets to be sealed when said member moves longitudinally with respect to the edges to be sealed, a second member slidably mounted on said first member for movement relative to said first member in a direction normal to the edges of said sheets and along an axis lying in the plane of said sheets, second guide means operatively associated with said second member to provide fine positioning of said second member relative to the edges to be sealed, means for storing a supply of heat sealing tape, a folder attached to said second member, said folder being adapted to continuously fold said tape longitudinally as it is withdrawn from said storage means, a pair of cooperating precreaser rollers attached to said second member, said precreaser rollers being adapted to advance said tape after it has passed through said folder while said tape is folded longitudinally, the pressure of said rollers against said folded tape being adapted to form a temporary longitudinal crease in said tape, drive means connected to said precreaser rollers to rotate said rollers, means for continuously applying the temporarily creased tape in overlapping relationship with the edges of the sheets to be sealed, a heater connected to said second member, said heater comprising a casing, said casing having an inlet and an outlet, a source of gas pressure connected to said inlet, heating means disposed in said casing to heat gas passing into said casing through said inlet, means to control the temperature of said heating means, means to control the pressure of said gas, and nozzle means connected to said outlet, said nozzle means having openings therein to direct gas heated by said heater onto exposed surfaces of said tape after said tape has been applied to said edges, said tape being thereby sealed to said sheet material to form a seam between the edges of said sheets without subjecting said sheets to substantial lateral forces during the sealing operation.

14. A heat sealing apparatus for sealing together the edges of two sheets of plastic material with a flexible tape comprising movable support means, means carried by said support means for folding said tape about the edges of said sheet, tape supply means on said support means, means for precreasing said tape before it reaches said folding means, said precreasing means including a troughed folding blade and a pair of substantially identical pressure rollers, said tape being folded along its longitudinal axis as it passes through said rollers, and means also carried by said support means for then sealing the inner surfaces of said tape to said edges, said last mentioned means including a source of gaseous medium, means for heating said gaseous medium, and means for directing said gaseous medium onto the tape so as to seal said tape to the sheets.

15. A heat sealing apparatus for sealing together the edges of sheet material comprising a support, means attached to said support for continuously applying heat sealing tape in overlapping relationship with the edges of the sheets to be sealed as said support moves relative to said sheets, a heater connected to said support comprising a casing having an inlet and an outlet, a source of gas pressure connected to said inlet, heating means disposed in said casing to heat gas passing into said casing through said inlet, means to control the temperature of said heating means, means to control the pressure of said gas, a pair of nozzles connected to said outlet, said nozzles having openings therein to direct gas heated by said heater onto the exposed surfaces of said tape after said tape has been applied to the edges, said openings being inclined with respect to the surfaces of said tape so that the heated gas passing therethrough travels across said tape in the same direction as said tape and sheet material passes through said apparatus.

References Cited in the file of this patent

UNITED STATES PATENTS

| | | |
|---|---|---|
| 1,734,287 | Cornell | Nov. 5, 1929 |
| 2,711,779 | Carland | June 28, 1955 |
| 2,749,966 | Roetger | June 13, 1956 |
| 2,786,511 | Reid | Mar. 26, 1957 |
| 2,997,098 | Riese et al. | Aug. 22, 1961 |